Sept. 3, 1929.  G. T. SUMMERS  1,726,723
DUMP BED HOIST FOR TRUCKS
Filed April 19, 1927　　2 Sheets-Sheet 1

INVENTOR
GEORGE T. SUMMER,
BY
ATTORNEYS

Sept. 3, 1929.  G. T. SUMMERS  1,726,723
DUMP BED HOIST FOR TRUCKS
Filed April 19, 1927  2 Sheets-Sheet 2
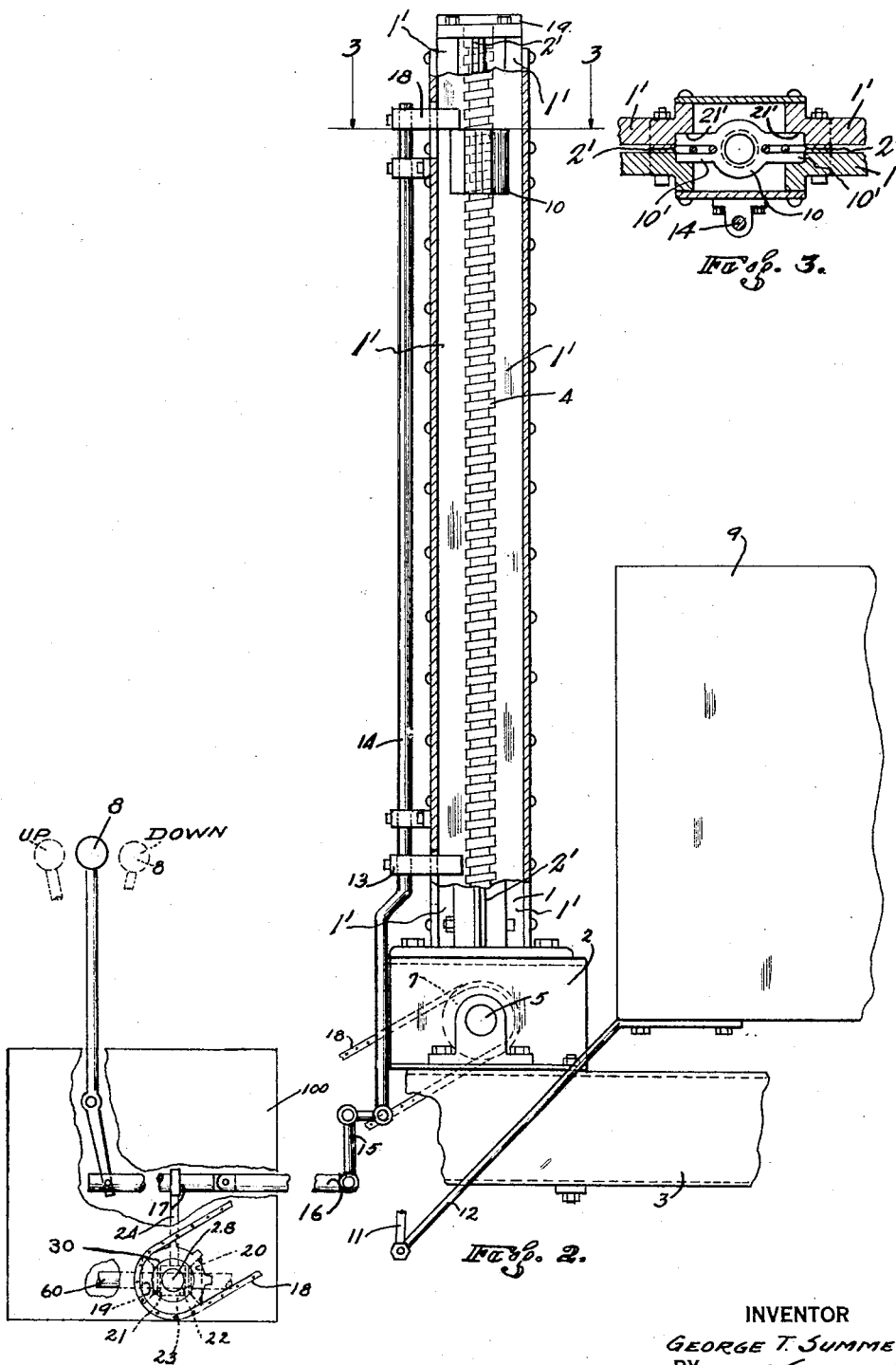
INVENTOR
GEORGE T. SUMMERS.
BY
ATTORNEYS.

Patented Sept. 3, 1929.

1,726,723

UNITED STATES PATENT OFFICE.

GEORGE T. SUMMERS, OF WOODLAND, CALIFORNIA.

DUMP-BED HOIST FOR TRUCKS.

Application filed April 19, 1927. Serial No. 184,972.

An object of my invention is to provide a dump bed hoist for trucks which is to be used in connection with the transmission mechanism and power takeoff shown in my co-pending application Serial No. 184,971 filed April 19, 1927.

The hoist is constructed for automatically raising or lowering the truck bed when the operator moves the control lever into either one of two positions and then for automatically returning the control lever to neutral position after the bed has been moved into its uppermost or its lowermost position.

Other objects and advantages will appear in the following specification, and the novel features of my invention will be particularly pointed out in the appended claim.

My invention is illustrated in the accompanying drawing forming a part of this application, in which—

Figure 2 is a vertical section through the device; and

Figure 3 is a section along the line 3—3 of Figure 2.

Figure 1:
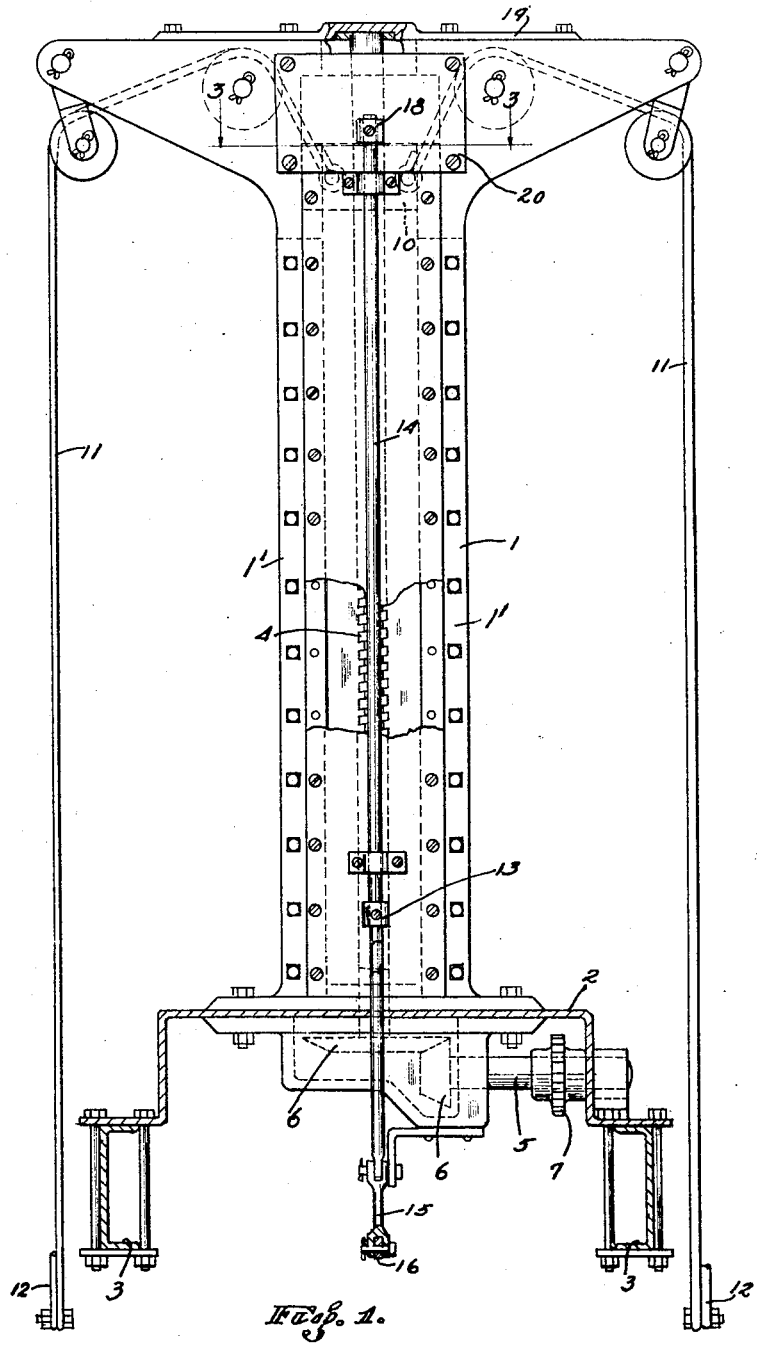
Figure 1 is a front elevation of the device, a portion thereof being shown in section.

In carrying out my invention I provide a guide frame 1 which is secured to a crosspiece 2, the latter being carried by the channel irons 3 of a truck. The frame or casing 1 comprises two pairs of uprights 1', each pair having its uprights separated by shims 2' for forming guideways 21', as shown in Figure 3. The casing houses a lifting screw 4 and this screw is in mesh with a stub shaft 5 by means of bevel gears 6. The shaft 5 carries a sprocket 7 which is operatively connected to the drive sprocket shown in my co-pending application, the connection being made by means of a chain.

I disclose in my co-pending application how the drive sprocket can be rotated in either direction when a lever shown in the co-pending application and illustrated in Figure 2 in the present application, is moved into either one of two positions. The lever 8 is shown in neutral position by the full lines and in dotted lines positions for the up and down movements of the truck body 9.

A collar 10 is mounted upon the screw 4 and is adapted to be raised and lowered by the screw when the latter is rotated in one direction or the other. The collar 10 has arms 10' that ride in guideways 21', as shown in Figure 3. Figure 1 clearly shows how the collar 10 has cables 11 connected thereto while Figure 2 shows the cables 11 as being secured to an arm 12, which in turn is connected to the body 9.

From the foregoing description of the various parts of the device the operation thereof may be readily understood. Assume that a truck driver wishes to raise the body 9: the truck driver shifts the lever 8 into the "up" position whereupon the mechanism in my co-pending application will cause the screw 4 to rotate and to lower the collar 10. This in turn will cause the body 9 to rise and thus to dump its contents. As the body nears its uppermost position, the collar 10 will strike a lug 13 and will move the lug downwardly a slight distance. The lug is carried by an upright 14 which in turn is connected by a bell-crank lever 15 to a link 16. The link is connected to a rod 17 shown in my co-pending application, and the rod in turn is operatively connected to the lever 8 so that a movement of the lug 13 downwardly will cause the lever 8 to be swung from up position to neutral position.

After the load has been dumped the driver shifts the lever 8 into down position and the screws 4 will be rotated in an opposite direction for slowly raising the collar 10, which in turn permits the body 9 to swing back into the position shown in Figure 2. The collar 10 on its upward movement strikes a lug 18 carried by the rod 14 and causes the bell-crank lever 15 to swing in an opposite direction and to return the lever 8 to neutral position. This construction relieves the driver of the necessity of stopping the operating mechanism when the body 9 has been raised into its uppermost position or lowered into its lowermost position.

It should be noted from the drawings that the device is so constructed as to permit plates 19 and 20 to be removed from the frame 1, thus permitting the sleeve or collar 10 to be removed from the device, if desired. Shims 2' may be added or removed for adjusting the width of the guideways 21'.

In Figure 2 I show a part of the mechanism shown in my co-pending application to illustrate the connection between the source of power, and the screw 4. The rod 17 carries a fork 24 which moves the clutch member 23 into engagement with either the clutch members 21 or 22. The auxiliary shaft 60 of the transmission 100 rotates either the bevel gear 19 or the bevel gear 20, depending upon the will of the driver. Either of these rotates a common bevel gear mounted on a shaft 28. The shaft 28 carries a sprocket 30 which is operatively connected to the sprocket 7 by a chain 18.

The lever 8 is disposed in the driver's cab while the frame 1 is disposed directly in back of the cab (not shown) and in front of the dump bed 9.

I claim:

A hoist comprising a casing constructed of four uprights, said uprights being disposed in pairs, shims spacing the uprights of each pair away from each other, each pair of uprights having guideways therein, said guideways being adjusted as to width by the removal or addition of shims, a screw mounted in said casing, a collar mounted upon said screw and having arms slidably receivable in said grooves, and cables secured to said collar.

GEORGE T. SUMMERS.